(12) United States Patent
Bonte et al.

(10) Patent No.: US 9,730,391 B2
(45) Date of Patent: ***Aug. 15, 2017

(54) AGRICULTURAL BALER WITH AUXILIARY MOTOR

(71) Applicant: CNH Industrial America LLC, New Holland, PA (US)

(72) Inventors: Xavier G. J. M. Bonte, Et Sint Kruis (NL); Stefan De Rycke, Olsene-Zulte (BE); Frederik Demon, Brugge (Sint-Kruis) (BE); Pieter Vandevelde, Sint Michiels Brugge (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/779,476

(22) PCT Filed: Mar. 27, 2014

(86) PCT No.: PCT/EP2014/056130
§ 371 (c)(1),
(2) Date: Sep. 23, 2015

(87) PCT Pub. No.: WO2014/154792
PCT Pub. Date: Oct. 2, 2014

(65) Prior Publication Data
US 2016/0295804 A1    Oct. 13, 2016

(30) Foreign Application Priority Data

Mar. 27, 2013 (BE) .............................. BE 2013/0212

(51) Int. Cl.
*A01F 15/08*     (2006.01)
*A01F 15/04*     (2006.01)
*A01F 21/00*     (2006.01)

(52) U.S. Cl.
CPC .......... *A01F 15/0841* (2013.01); *A01F 15/04* (2013.01); *A01F 15/042* (2013.01); *A01F 21/00* (2013.01)

(58) Field of Classification Search
CPC .... A01F 15/04; A01F 15/042; A01F 15/0841; A01F 21/00; A01F 15/08; A01D 69/005; Y10T 74/19684

(Continued)

(56) References Cited

U.S. PATENT DOCUMENTS 3,513,651 A * 5/1970 Hollyday ............ A01F 15/0841
100/189
5,894,718 A * 4/1999 Hawlas ............... A01F 15/0841
100/88

(Continued)

FOREIGN PATENT DOCUMENTS

EP          1974601 A1    10/2008

*Primary Examiner* — Jimmy T Nguyen
(74) *Attorney, Agent, or Firm* — Patrick M. Sheldrake

(57) ABSTRACT

An agricultural baler has a shaft for coupling with a PTO, a flywheel connected to the shaft, and a plunger connected to the flywheel via a crank. An auxiliary motor is connectable to the flywheel and adapted for rotating said flywheel depending on a control signal. A motor controller is connected to the auxiliary motor and provided with an algorithm for determining the control signal for automatically rotating the flywheel to a predetermined launch position.

6 Claims, 8 Drawing Sheets

(58) Field of Classification Search
USPC .............................. 100/179, 282; 74/421 A
See application file for complete search history.

(56) References Cited

U.S. PATENT DOCUMENTS

| | | | | |
|---|---|---|---|---|
| 6,105,353 | A | * | 8/2000 | Mohr .................... A01D 69/005 |
| | | | | 475/153 |
| 6,651,416 | B2 | * | 11/2003 | Trelstad .............. A01F 15/0841 |
| | | | | 56/10.2 R |
| 7,464,526 | B2 | | 12/2008 | Coenen |
| 8,113,078 | B2 | | 2/2012 | Lang et al. |
| 2010/0108413 | A1 | * | 5/2010 | Lang .................... A01F 15/0841 |
| | | | | 180/53.1 |

* cited by examiner

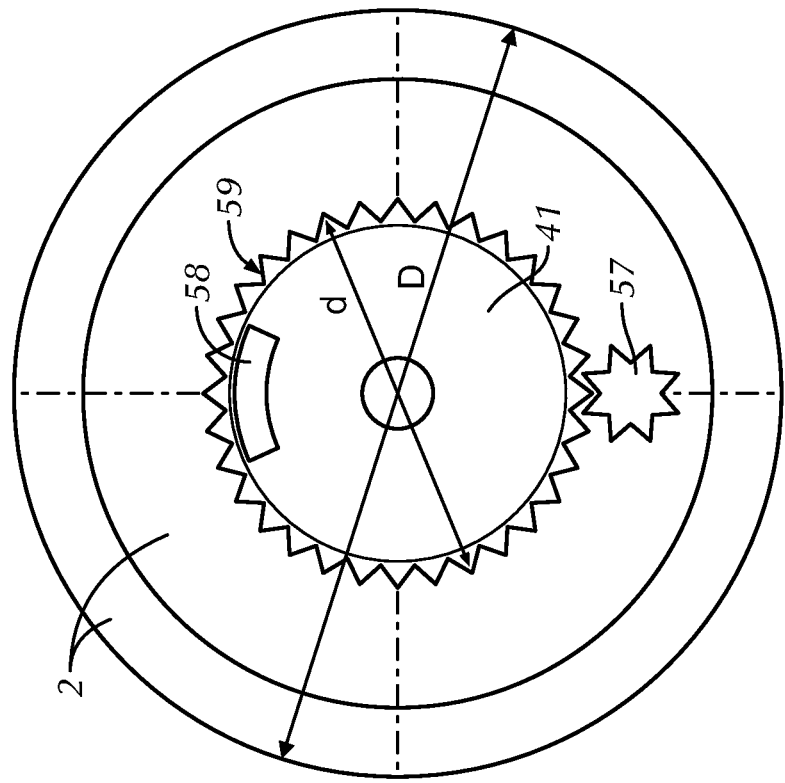
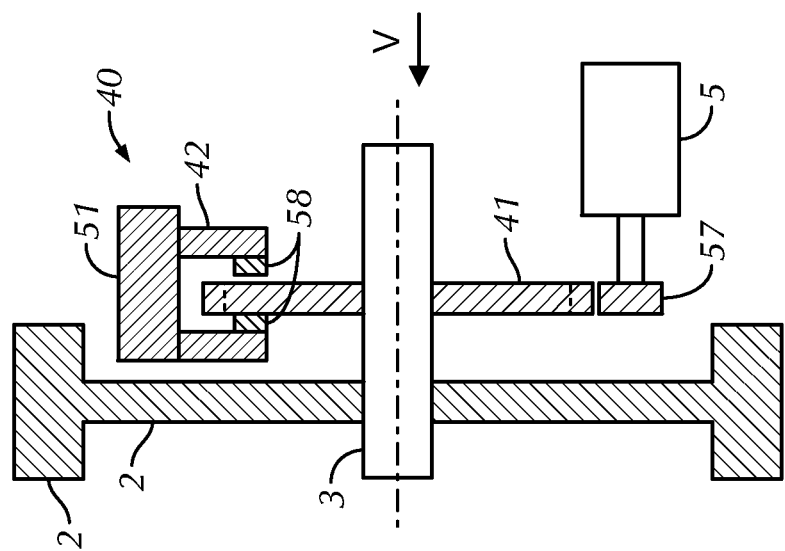
FIG. 5
FIG. 4

AGRICULTURAL BALER WITH AUXILIARY MOTOR

This application is the US National Stage filing of International Application Serial No. PCT/EP2014/056130 filed on Mar. 27, 2014 which claims priority to Belgian Application BE2013/0212 filed Mar. 27, 2013, each of which is incorporated herein by reference in its entirety.

FIELD OF THE INVENTION

The invention relates to the field of agricultural balers for producing bales of compressed agricultural crop material. More specifically, the present invention relates to balers with an auxiliary motor connectable to the flywheel.

BACKGROUND OF THE INVENTION

The vast majority of balers does not have its own engine, but is towed by a tractor, and is powered by coupling the power take-off (PTO) shaft of the tractor to an input shaft of the baler. The baler further has a flywheel connected to the input shaft, and a gearbox that drives the various mechanisms in the baler to pick-up the crop from a field, to form the crop into bales and to wrap twine and/or foil around the bales.

A one-way clutch is typically arranged between the PTO shaft and the flywheel to allow the flywheel to rotate faster than the PTO shaft. The baler input shaft can be operatively decoupled from the tractor PTO, e.g. for transportation of the baler from one field to the other.

A large and heavy flywheel is typically required in a baler, especially in so called "large square balers", or "high density balers" to overcome peak loads encountered by the baler gearbox, which occurs e.g. when the plunger of the baler compresses the crop material in the bale chamber when forming the bales. By using a flywheel with a high inertia and running at a high speed (e.g. 1000 rpm), peak energy for the peak loads can be delivered by the flywheel. During the compression the flywheel slightly slows down, but is accelerated again by the tractor PTO between two compressions.

A problem of a heavy flywheel is that it becomes more difficult to start-up such a baler, because of the high inertia of the flywheel. EP1974601 addresses this problem by disclosing a large-bale baling press with a starting arrangement having an auxiliary drive, which assists in a first phase of starting up the large-bale baling press, until the main drive accelerates to a higher speed than the auxiliary drive.

Another problem of a heavy flywheel is that it becomes more difficult to manually rotate the flywheel during maintenance. This problem is addressed in EP2193707, where a baler is described with an auxiliary motor configured to operate components of the baler in a slow manner for adjustment or maintenance. The motor may be operated in forward or reverse mode.

Another problem of the high inertia is that it takes more time to switch off the baler. This problem is not addressed in the art. Instead, one just waits until the baler finally comes to a stop, but until that moment, approaching the baler is dangerous, as one might get caught by the moving mechanisms.

While recognizing the benefits of a baler with an auxiliary motor for the above mentioned purposes, the mounting arrangement thereof can be improved.

SUMMARY OF THE INVENTION

It is an object of embodiments of the present invention to provide a baler having an auxiliary motor which ensures an advantageous starting position of the crank and plunger assembly.

The above objective is accomplished by a method and devices according to the present invention.

In a first embodiment of the agricultural baler, an auxiliary motor is adapted for rotating a flywheel depending on a control signal, said baler further comprising a plunger connected to the flywheel via a crank, means for determining a position of the crank, a motor controller connected to the said means, and connected to the auxiliary motor for providing it with said control signal. The motor controller is provided with an algorithm for determining the control signal for automatically rotating the flywheel to a predetermined launch position.

This permits an automatic placement of the crank in an advantageous launch position, e.g. by rotating the crank backwards.

In embodiments of the agricultural baler, the auxiliary motor is adapted for helping to accelerate the flywheel during baler start-up.

In this embodiment, the motor should be able to drive the flywheel in forward direction so as to provide extra torque. In this embodiment, the motor is preferably a motor having a power of at least 1.0 kWatt (e.g. from 1.0 kWatt to 20 kWatt). In this way, the risk of a start-up failure of the baler is reduced or eliminated.

In embodiments of the agricultural baler, the auxiliary motor is adapted for rotating the flywheel backward.

Such an auxiliary motor may be a low power motor (e.g. less than 1.0 kWatt such as e.g. from 0.1 to 1.0 kWatt) adapted for reversing the flywheel at a low speed (e.g. less than 10 rpm such as e.g. from 1 to 10 rpm). Such an auxiliary motor may be able to drive the flywheel in backward direction or in both directions to assist an operator during maintenance work.

In a second aspect, the invention also provides a tractor and baler combination, comprising an agricultural baler according to the first aspect; a tractor having a PTO connectable to the shaft of the baler for accelerating the flywheel of the baler; wherein the tractor further comprises a tractor controller circuit for sending a command to the baler controller for selectively activating the disc brake system and/or the auxiliary motor.

This allows commands for starting, reversing or stopping the flywheel to be sent from the cabine of the tractor, without having to step next to the baler. This is faster, safer, and more convenient.

In a third aspect, the invention provides a method for positioning a crank of an agricultural baler (described above) in a predefined launch position, the method comprising the steps of determining the position of the crank based on data collected by the means; determining the control signal based on said position; activating said auxiliary motor based on said control signal so as to position said crank in said predefined launch position.

In a fourth aspect, the invention provides a computer program product that, when executed on a processing system of said agricultural baler, provides instructions for executing the method of the fifth aspect.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

The invention will be further elucidated by means of the following figures.

FIG. 4 is a schematic drawing in side view of a flywheel and disc brake and auxiliary motor arrangement according to an embodiment of the present invention.

FIG. 5 is a front view (direction V) of the schematic drawing of FIG. 4, further showing the position of a gear wheel and a brake pad according to an embodiment of the present invention.

Figure 1:
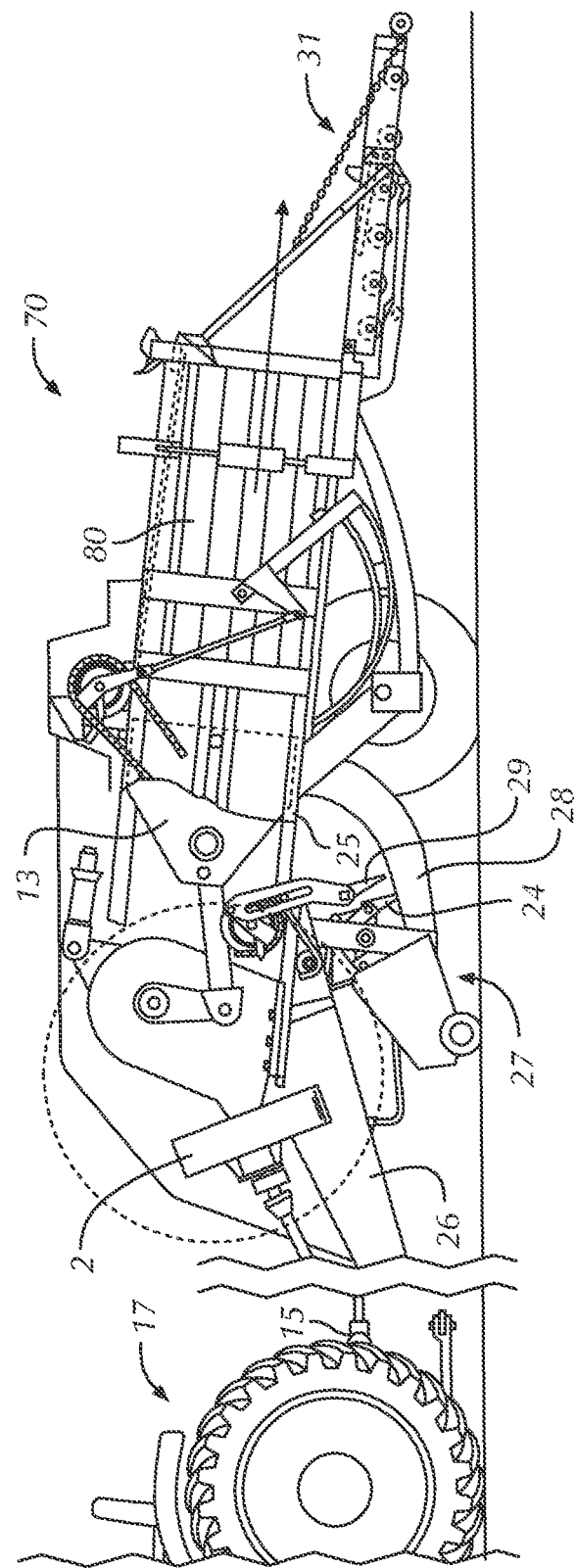
FIG. 1 is an side view of a classical tractor and a towable baler according to the prior art.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a "rectangular baler" reference is made to an agricultural baler for making cuboid bales (known as "rectangular bales").

Where in embodiments of the present invention reference is made to "high density bales", bales with a density higher than 100 kg/m$^3$, for example higher than 190 kg/m$^3$ are meant.

In the present invention, "centre of gravity" and "centre of mass" are used as synonyms.

Where in embodiments of the present invention reference is made to "disc brake system", reference is made to a device for slowing down or stopping a rotating wheel. In this application reference is made to the caliper-type of disc brakes, comprising a brake disc and a caliper, the brake caliper comprising two brake pads, to be forced to both sides of the disc.

Where in embodiments of the present invention reference is made to "brake disc", reference is made to the actual disc being part of the disc brake system.

Where in embodiments of the present invention reference is made to "normal direction" or "forward direction" of the input shaft or of the flywheel or of the crank of the baler, the rotation direction of the input shaft or of the flywheel or of the crank during normal production of bales is referred to.

Where in embodiments of the present invention reference is made to "normal operation of the baler", the condition of the baler is meant wherein the flywheel is rotated for producing bales.

Where in embodiments of the present invention reference is made to "reverse direction" or "backward direction" of the input shaft or the flywheel or the crank of the baler, the rotation direction opposite to the normal direction is referred to.

Agricultural balers of the type that can be towed and powered via a tractor PTO are known in the art. Referring to the drawings, FIG. 1 shows an example of an agricultural baler 70 comprising a frame 25 which is equipped with a forwardly extending tongue 26 at its front end with hitch means (not shown) for coupling the baler 70 to a towing tractor 17. A pick-up assembly 27 lifts windrowed crop material off the field as the baler 70 is travelled thereover, e.g. while being pulled by a tractor 17, and delivers such material into the front end of a rearwardly and upwardly curved, charge-forming feeder duct 28. The duct 28 communicates at its upper end with an overhead, fore-and-aft extending bale chamber 80 into which crop charges are loaded by a cyclically operating stuffer mechanism 29. A continuously operating packer mechanism 24 at the lower front end of the feeder duct 28 continuously feeds and packs material into the duct 28 so as to cause charges of the crop material to take on and assume the internal configuration of the duct 28 prior to periodic engagement by the stuffer mechanism 29 and insertion up into the bale chamber 80. The packer mechanism 24 may be replaced by a rotor mechanism which will also continuously feed and pack material into the duct 28. The feeder duct 28 may be equipped with means (not illustrated) for establishing whether a complete charge has been formed therein and operating the stuffer mechanism 29 in response thereto. Each action of the stuffer mechanism 29 introduces a "charge" or "flake" of crop material from the duct 28 into the chamber 80.

A plunger 13 reciprocates in a fore-and-aft direction within the bale chamber 80, at least within a first part thereof. Biomass fed via the feeder duct 28 is thereby compacted, e.g. compressed or otherwise treated, so as to form bales in the above-described operation of the agricultural baler 70. Cuboid shaped bales, also known as "rectangular bales" are formed. The formed bales may then be moved forward by the reciprocating motion of the plunger 13 to shift serially and incrementally along the bale chamber 80 towards a discharge outlet, wherefrom the bales may eventually be ejected. The baler 70 may furthermore comprise components such as a knotter mechanism for automatically tying the completed bales 16 with e.g. twine or similar lineal object to make them self-supporting, for example for shipping and storage. Once tied, the bales are discharged from the discharge outlet of the bale chamber 80 onto a discharge 31 in the form of a chute, for gently lowering the bales near ground level.

Large balers 70, especially rectangular balers 70 for producing high-density bales typically have a flywheel 2 with a relatively large diameter (e.g. in the range of 75 to 130 cm, e.g. 110 cm) and heavy weight (e.g. in the range of 300 to 1000 kg, e.g. 700 kg) for obtaining a high inertial mass or energy equivalent. When all crop material of one field is compacted into bales, the baler 70 is temporarily stopped, e.g. by decoupling or disabling the tractor PTO 15. While running freely, the flywheel 2 will gradually slow down until it stops, and the related functions, such as the pick-up, packer or stuffer mechanism are deactivated along with the flywheel 2. The baler 70 is then brought to another field, usually while there is still some crop material left in the bale chamber 80. When arriving at the next field to be harvested, the baler 70 needs to be started up again, but it has been found, particularly with large balers 70 having a large and heavy flywheel 2, that problems may arise due to the high inertia of the flywheel 2, especially when there is still crop material left in the bale chamber 80, which is almost always the case, since balers 70 are not emptied between different fields. The start-up problems may be solved by using an auxiliary motor 5, which needs to be operatively connectable to the flywheel 2.

Figure 2:
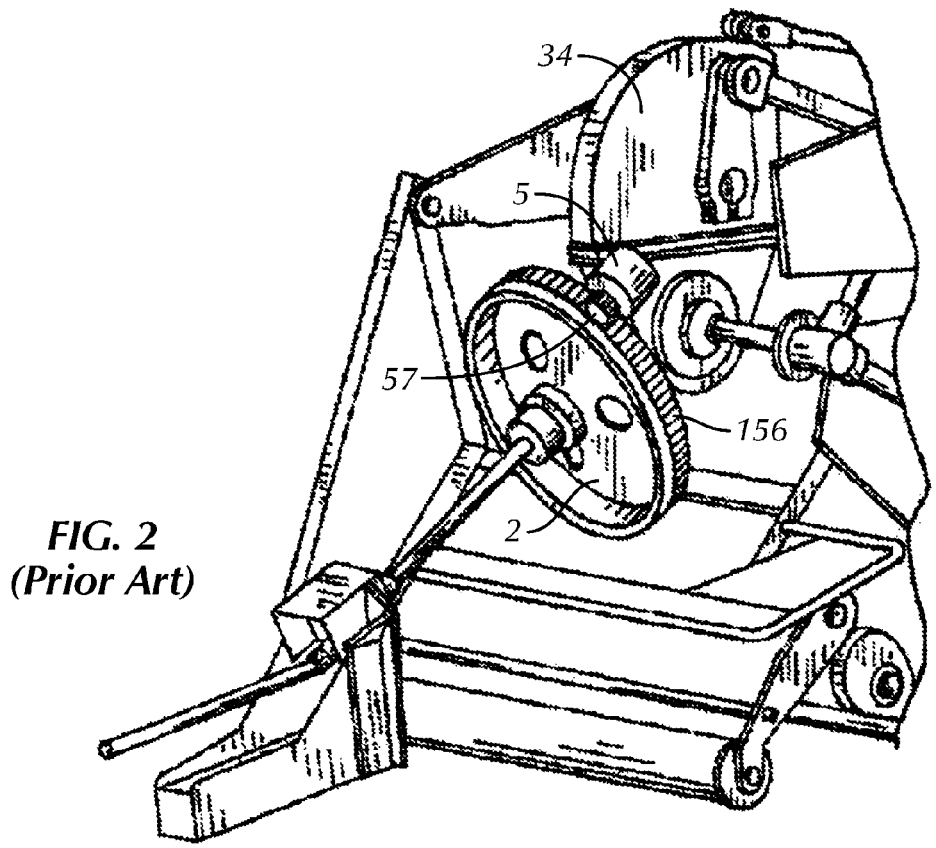
FIG. 2 shows a baler with a flywheel and an auxiliary motor, known in the art.

FIG. 2 shows part of a prior art agricultural baler with a flywheel 2 having a toothed outer rim 156, and an auxiliary motor 5 arranged thereto via a gearwheel 57. However, providing a toothed outer rim on a large and heavy flywheel becomes extremely difficult and expensive, and it would be very difficult to keep tolerances under control.

Figure 3:
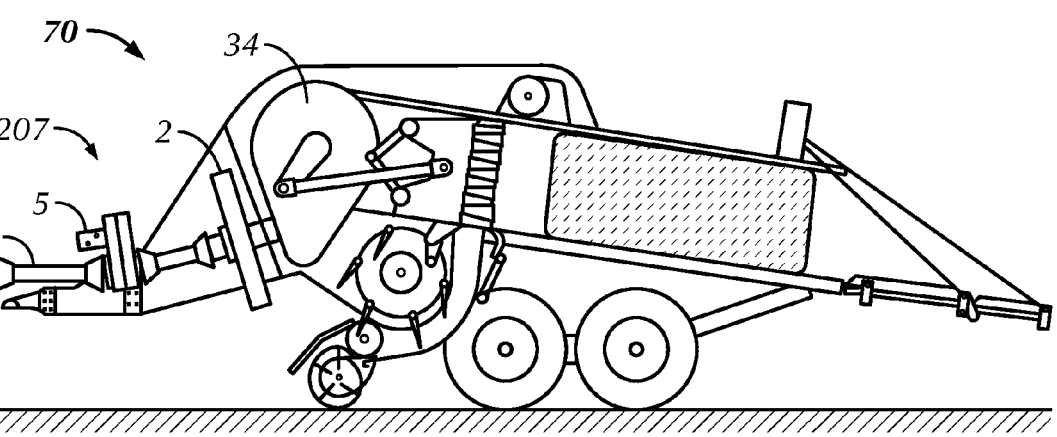
FIG. 3 shows another baler with a flywheel and auxiliary motor, known in the art.

FIG. 3 shows another prior art agricultural baler 70, with an auxiliary motor 5 as part of a startup device 207, arranged between the input shaft 3 of the baler 70 and the flywheel 2. This arrangement requires several extra components, occupies extra space, and complicates the shaft interconnections.

While looking for a more suitable arrangement to connect the auxiliary motor 5 to the large and heavy flywheel 2, the inventors came up with the idea of adding a disk brake system 40 to the flywheel 2, and providing the brake disc 41 with a toothed rim 59 (e.g. a toothed outer rim) for engagement with the auxiliary motor 5.

Such a baler flywheel arrangement is schematically illustrated in FIG. 4. A huge advantage of providing a disc 41 with a toothed rim 59, is that it is much easier to produce a relatively small disc 41 with a toothed rim 59, than a large and heavy flywheel 2 with a toothed outer rim. For example, the flywheel 2 may have a three-dimensional shape with an outer diameter "D" in the range of 75 to 130 cm, e.g. 110 cm, and a maximum thickness of 40 to 60 cm, e.g. 50 cm, and a weight in the range of 240 to 1000 kg, e.g. 700 kg, whereas the brake disc 41 may have a substantially planar shape, with a diameter "d" in the range of 30 to 60 cm, e.g. 45 cm, and a thickness of 25 to 35 mm, e.g. 30 mm, and a weight in the range of 20 to 40 kg, e.g. 30 kg. Such a disc 41 is much easier to handle and to machine than such a flywheel 2, and the tolerances, especially those of the toothed rim 59 can be kept much better under control. A disc 41 with a toothed outer rim 59 is preferred to a toothed inner rim because it is easier to removably mount the auxiliary motor thereto, and because it is easier to produce.

By providing a brake disc 41 with a relatively large diameter (as compared to the diameter of the shaft), a relatively large torque can be transmitted to the shaft 3 by the auxiliary motor 5. It is to be noted that the diameter "d" of the disc 41 can be selected independent of the diameter "D" of the flywheel 2, so that the dimensions of the flywheel 2 and those of the disc 41 can be optimized separately. The same applies to their thickness.

In addition, by adding a brake caliper 51, which is a relatively small component, and by machining part of the side surface of a disc 41, which is an inexpensive extra machining step since the disc 41 is machined already for providing the toothed rim 59, the disc 41 becomes a brake disc 41, and hence disc brake functionality is added to the flywheel 2 with a minimum of extra components, and by sharing the same disc 41 with toothed rim 59 as can be used for start-up.

An advantage of this flywheel and disk brake system arrangement is that it may be used for several purposes:
1) for keeping the flywheel 2 in a fixed position (for preventing rotation thereof), e.g. during transport. In the prior art, this function is typically performed by using a belt which can be tensioned around a section of the flywheel;
2) for actively slowing down the flywheel 2 when the baler 70 is switched off. This offers the advantage that the switch-off of the baler is considerably faster and use of the baler is considerably safer. Optionally the crank arm 6 is thereby positioned in a suitable launch-position as disclosed in co-pending patent application PCT/EP2014/053067 of the applicant, which will be described further in relation to FIG. 9 to FIG. 11;
3) for engagement with an auxiliary motor 5, thanks to the toothed rim 59 (e.g. a toothed outer rim) of the brake disc 41. The auxiliary motor 5 may e.g. be adapted for slowly forwarding or reversing the flywheel 2 during maintenance or repair, or may e.g. be adapted for providing extra torque during baler start-up, or any combination hereof.

All these functions are related to a single brake disc 41 with a toothed rim 59, thus saving material, weight and cost.

It should be stressed that the FIGS. 4 to 8 are only schematic drawings, they are not drawn to the scale, but only show the principles of the invention. For example, the flywheel 2 and the parts of the disc brake system 40 as shown have a very simple shape for illustrative purposes, so as not to obscure their relation with the other elements shown in the figure. The same applies for the number of teeth and/or the shape of the toothed outer rim 59 of the brake disc 41 and that of the gear wheel 57 in FIG. 5, which are only shown for illustrative purposes. The design of toothed gear wheels is known in the art, and need not be described in further detail in this application.

Several embodiments are described next. In FIG. 4 the brake disc 41 is mounted on the shaft 3, and is thus mounted to the flywheel 2 indirectly, whereas in the embodiments of FIG. 6 and FIG. 7, the brake disc 41 is mounted to the flywheel 2 directly. The brake disc 41 may be connected to the flywheel 2 by removable fastening means (not shown), such as e.g. screws. The brake disc 41 has a toothed outer rim 59, as can be seen from FIG. 5 which is a view from angle V in FIG. 4. The toothed outer rim 59 is provided for engaging with an auxiliary motor 5, e.g. via a gear wheel 57. The auxiliary motor 5 may be e.g. an electric motor or a hydraulic motor, or a pneumatic motor. The motor 5 may be fixedly mounted to the brake disc 41, or may be manually or automatically connectable to and removable from the disc brake 41, e.g. in an embodiment where the auxiliary motor 5 is adapted for delivering extra power for assisting start-up of the flywheel 2, and is thereafter removed therefrom. The brake disc 41 is preferably made of steel or cast iron. The brake disc 41 may have holes drilled through them, for heat dissipation purposes. The brake caliper 51 may be a floating caliper (having a single piston), but is preferably a fixed caliper, for avoiding sticking failures.

In embodiments, the disc brake system 40 comprises the brake disc 41 described above, and a brake caliper 51, having a pair of brake claws 42, each having a brake pad 58 made of a high friction material for contacting the side surface of the brake disc 41 when the disc brake system 40 is activated. Caliper-type disc brake systems 40 (but not comprising toothed rims) are well known in the field of automobiles and railway, and therefore need not be described in further detail here. The disc brake system 40 may be activated in any known way, e.g. mechanically, hydraulically, pneumatically or electromagnetically. In an embodiment the disc brake is activated manually by means of a handbrake lever. Caliper-type disc brake system 40 have the advantage (e.g. over drum brakes) that the braking force can be better controlled, because the braking force is proportional to the pressure placed on the brake pad 58 by the braking system, e.g. via a brake servo, braking pedal or lever, and a caliper-type disc brake cannot block because of lack of self-assist.

Figure 6:
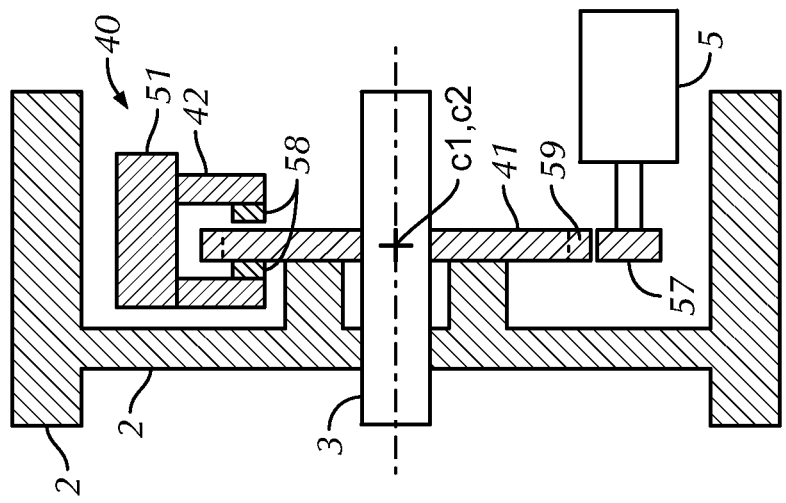
FIG. 6 is a schematic drawing in side view of another flywheel and disc brake and auxiliary motor arrangement according to an embodiment of the present invention.

FIG. 6 shows a variant of the flywheel arrangement of FIG. 4, wherein the brake disc 41 is connected directly to the flywheel 2, e.g. by means of screws (not shown). An advantage of mounting the brake disc 41 directly to the flywheel 2 is that the forces applied to the brake disc 41, during acceleration of the flywheel 2 (e.g. at baler start-up), and during deceleration of the flywheel 2 (e.g. when braking) are directly transferred from the disc 41 to the flywheel 2, instead of via the shaft 3. This prevents a large torque to be applied over the shaft portion between the flywheel 2 and the brake disc 41. Another advantage is that heat transfer (during braking) is increased, thanks to the larger contact area with the flywheel 2, closer to the braking surface as compared to direct mounting of the brake disc 41 to the shaft 3. It is to be noted that in the embodiment shown, the center of mass c1 of the flywheel 2 and the center of mass c2 of the brake disc 41 do not coincide.

Figure 7:
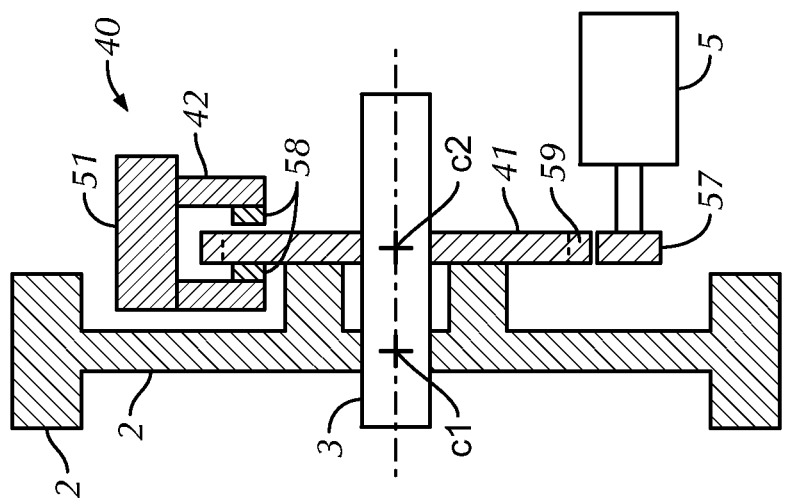
FIG. 7 is a schematic drawing of an embodiment of a flywheel and brake disc assembly shaped and arranged for having coinciding centers of mass according to an embodiment of the present invention.

FIG. 7 shows another variant of the flywheel arrangement of FIG. 6, wherein the flywheel 2 is shaped such that the centre of mass c1 of the flywheel 2, and the centre of mass c2 of the brake disc 41 coincide. The main advantage hereof is that during acceleration or deceleration of the flywheel 2 by means of the disc brake 41, the forces exerted upon the shaft 3 are largely reduced. This also reduces stresses exerted upon other components connected to the shaft, such as e.g. the shaft bearings (not shown).

Figure 8:
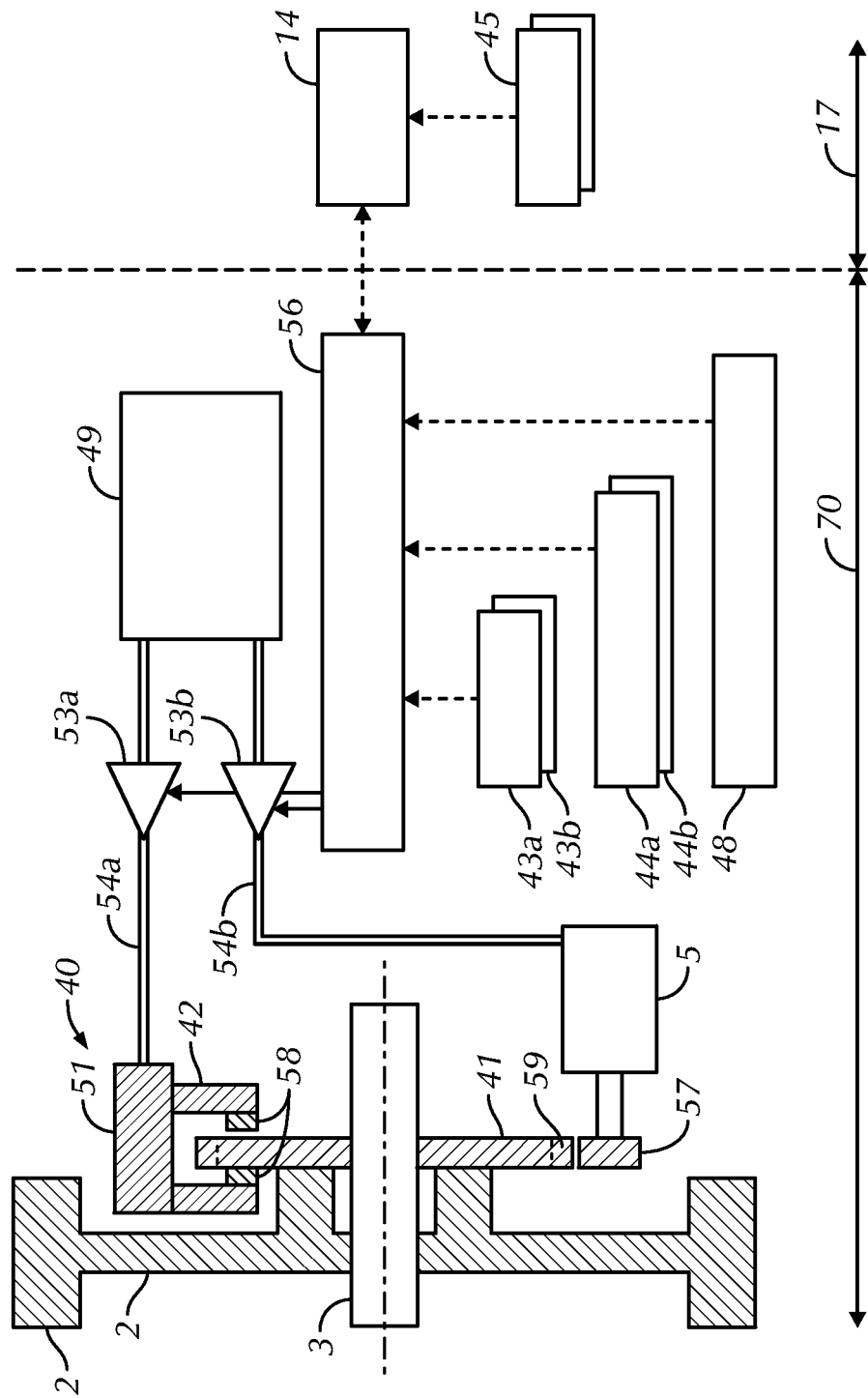
FIG. 8 is a schematic drawing of a system comprising a tractor (right) and a baler (left), the baler comprising the flywheel and disc brake and auxiliary motor arrangement of FIG. 6.

FIG. 8 is a schematic drawing of an example of a system comprising a tractor (right) and a baler (left), the baler 70 comprising any of the flywheel arrangements described above. In fact, the system embodiment of FIG. 8 combines several technical features, which may also be implemented separately, or combined differently.

Common to all embodiments shown in FIG. 4 to FIG. 8 is the brake disc 41 having a toothed rim 59 (e.g. toothed outer rim), and a smooth, e.g. machined side portion (not shown) adapted for contacting brake pads 58, and an auxiliary motor 5 with a gearwheel 57 for engaging the toothed rim 59. The brake caliper 51 is preferably mounted to a gearbox 34, which is a rigid part, typically located close to the flywheel 2, but other suitable parts of the baler frame 25 may also be used for mounting the brake caliper 51.

The brake caliper 51 in the embodiment of FIG. 8 is a hydraulic caliper operationally coupled to the hydraulic system 49 of the baler 70 via hydraulic lines 54a and a first control valve 53a. The brake caliper 51, may comprise two or more pistons, also called 'pots'. The control valve 53a is controlled via a baler controller 56 comprising a brake controller (not shown) and a motor controller (not shown), either as separate controllers or as a single integrated controller. The baler controller 56 may e.g. be an electronic controller adapted for activating or deactivating the brake caliper 51 with a predetermined braking force, corresponding to a brake command given by any of the input devices 43, 44, 48, 45. In an embodiment, the baler 70 has a sensor 43a for detecting if a door or panel (not shown) is opened, and for sending a signal to the baler controller 56 for activating the disc brake system 40 for stopping and/or holding the flywheel 2 in a fixed position as long as the door or panel is open. In the same, a further or another embodiment, the baler controller 56 may be connected to a tractor controller, which may send a command from a tractor input device 45, e.g. a handle or a button, for activating the disc brake system 40. In the same, a further or another embodiment, the baler 70 may have a local input device 44a, e.g. a handle, a button, a pedal or another input device, connected to the baler controller 56, for activating the disc brake system 40. In the same, a further or another embodiment, the baler 70 may have an emergency input device 48, e.g. an emergency button or emergency foot pedal connected to the baler controller 56, e.g. for activating the disc brake system 40 in such a way that the flywheel 2 is stopped as soon as possible (e.g. by exerting the maximum possible braking force).

The baler 70 further comprises an auxiliary motor 5, which may be arranged for slowly rotating the flywheel 2 in forward or reverse direction, e.g. for maintenance or repair purposes. The auxiliary motor 5 may also be arranged for providing extra power, besides the power delivered by the tractor PTO shaft 15, during start-up of the baler 70, e.g. during a first phase of the start-up, until the flywheel 2 has reached a predetermined angular velocity. During a second phase, the auxiliary motor 5 may or may not disengage from the brake disc 41. The auxiliary motor 5 in FIG. 8 is a hydraulic motor, but another motor could also be used, e.g. an electric or pneumatic motor (not shown). The motor 5 shown in the embodiment of FIG. 8 is operationally coupled to the hydraulic system 49 of the baler 70 via hydraulic lines 54b and a second control valve 53b. The second control valve 53b is controlled via a baler controller 56 comprising a motor controller. The motor controller could also be a separate controller. The motor controller may e.g. be an electronic controller adapted for activating or deactivating the auxiliary motor 5, in ways known in the art. The baler 70 may have an input device 44b, e.g. a button for rotating the motor 5 slowly backwards (i.e. in reverse direction R), or a button for rotating the motor 5 slowly forwards (i.e. the normal direction F), or a button for accelerating the flywheel 2 in a first phase of baler start-up. There may also be a handle (or other mechanism) for engaging or disengaging the auxiliary motor 5 from the brake disc 41. When the motor controller 56 is connected to a tractor controller 14, the command for starting the motor 5 for accelerating the flywheel 2 at baler start-up may also be given by the tractor controller 14.

Figure 9:
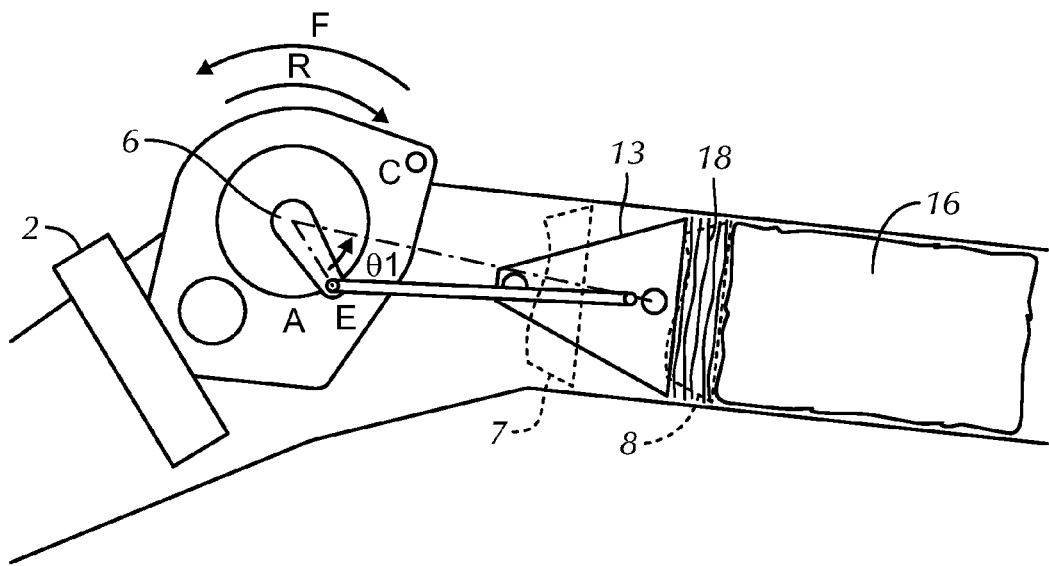
FIG. 9 is an enlarged view of part of the baler of FIG. 1, wherein the crank is in an unfavorable position 'E' for start-up.

The inventors have found that the start-up problem of the baler 70 occurs when the flywheel 2 does not "survive" the first plunger impact, i.e. when the plunger 13 stalls during the first compression of the crop material in the bale chamber 80, shortly after start-up. An example of such a start-up position is illustrated in FIG. 9 showing the initial condition of the crank 6 and plunger 13 just before the baler 70 is started. In the example of FIG. 9, the crank 6 is located at an angular distance θ1 of approximately 45° with respect to the position which the crank 6 would assume when the plunger 13 is in its distal position 8 inside the bale chamber 80. When the baler 70 is started from this initial condition of the crank 6 and plunger 13, the flywheel 2 cannot gain sufficient speed before the plunger 13 impacts or reaches the crop material 18, e.g. straw in the bale chamber 80, and the tractor engine stalls or the safety mechanism declutches the PTO 15 from the tractor engine, resulting in a start-up failure of the baler 70.

During the tests, the inventors also noted that, when switching-off the baler 70, and letting it slow-down freely, the flywheel 2 and crank 6 tended to automatically rotate to an unfavorable condition, e.g. close to crank position A or E in FIG. 9, corresponding to an angle θ1 of about 90° or about 45° respectively, because of the gravity force acting on the heavy crank-arms 6.

Figure 10:
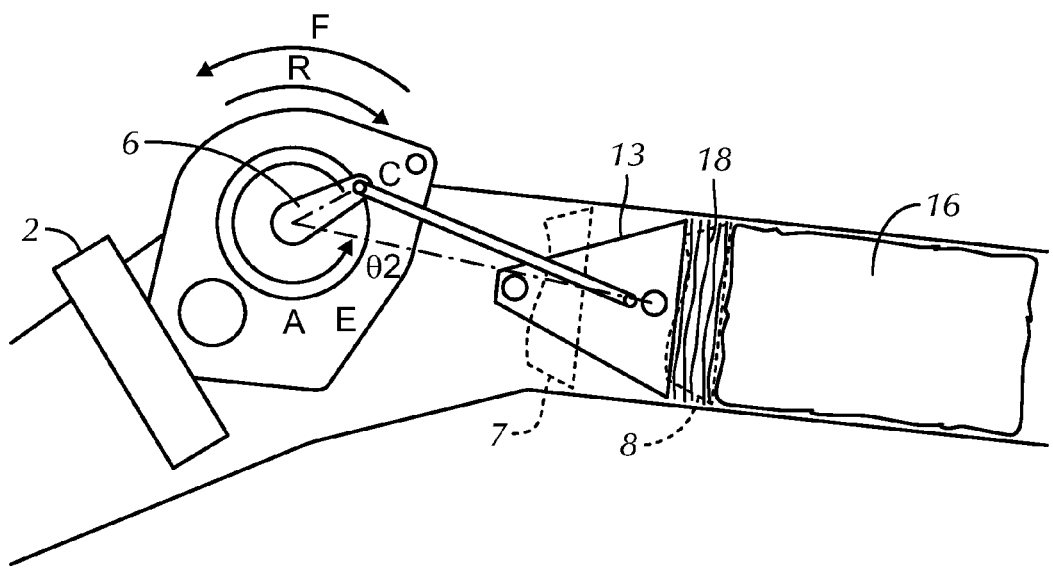
FIG. 10 is an enlarged view of part of the baler of FIG. 1, wherein the crank is in a favorable position 'C' for start-up.

The inventors also found that, when the baler 70 was started from a favorable crank position, e.g. crank position C in FIG. 10, the start-up of the baler 70 never failed. In position C of FIG. 10, the crank 6 shows an angle θ2 at an angular distance of about 300° with respect to the position which the crank 6 will assume after rotating the flywheel 2 in forward direction F until the plunger 13 reaches its distal position 8 inside the bale chamber 80.

Figure 11:
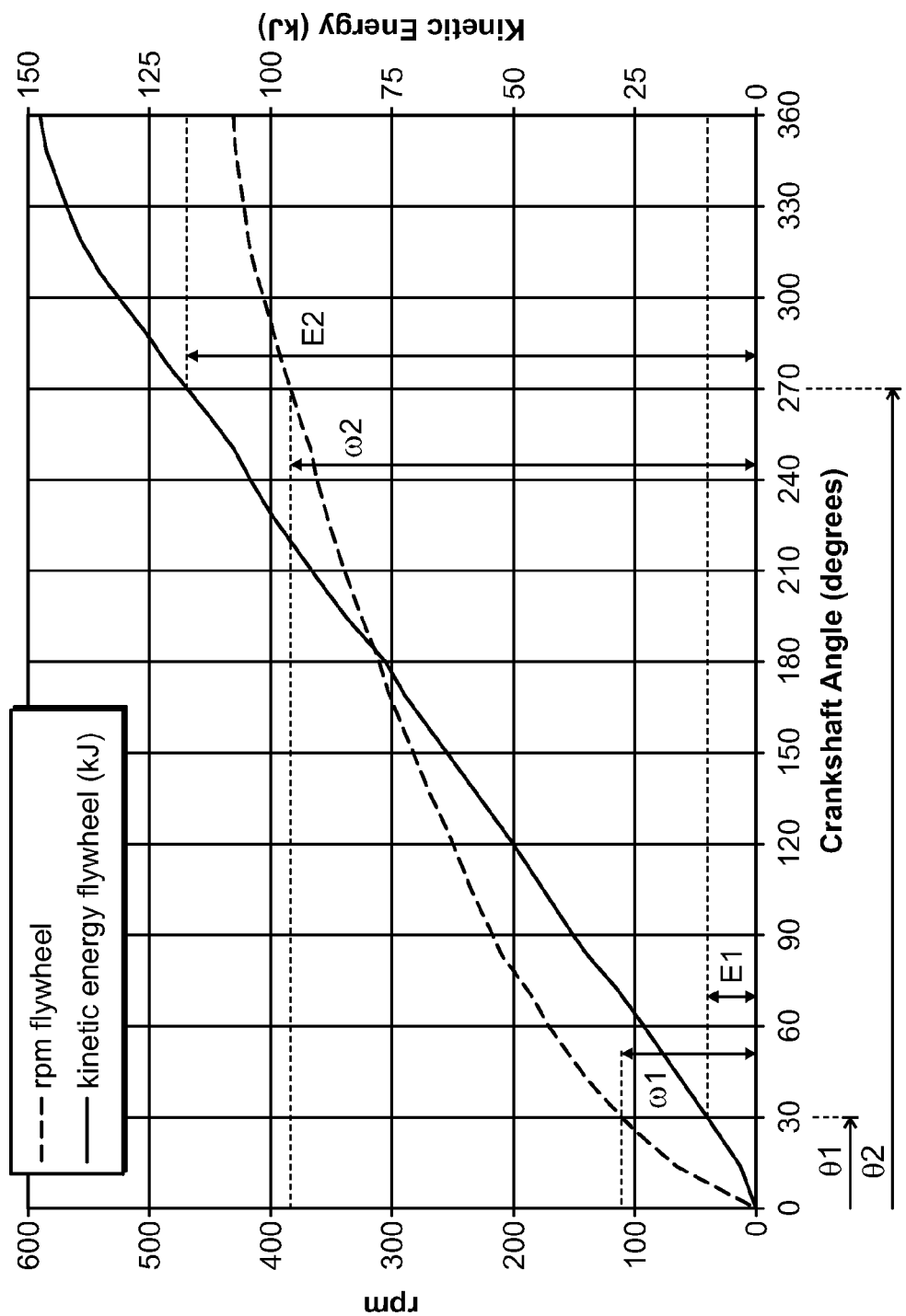
FIG. 11 shows an example of the rotational speed and corresponding kinetic energy of a flywheel of an empty baler at start-up.

This behavior was further investigated, and the start-up behavior of a flywheel 2 of a particular empty baler 70 and a particular tractor 17 combination, wherein the start-up sometimes failed, was measured, as shown in FIG. 11. The skilled person can easily make similar curves for other tractor 17 and baler 70 combinations, provided of course the tractor 17 has sufficient power to start-up the baler 70 under best-case conditions. In the particular case of FIG. 11, the empty baler 70 was started with its crank 6 in the position A, but another start-position could also be used, and the angular speed ω(t) of the flywheel 2 was measured, and plotted as shown in FIG. 11. On the horizontal axis the relative angular position θ of the crank 6 is shown with respect to its starting position. The angular velocity ω(t) of the flywheel 2 is shown on the left vertical axis, while the corresponding kinetic energy of the flywheel 2 is shown on the right vertical axis. It is to be noted that, due to the gearbox transmission ratio, the flywheel 2 rotates multiple times (e.g. 18 to 28 times) for each crank rotation. Only the first full revolution of the crank 6 after start-up is shown, which corresponds to a plurality of revolutions of the flywheel 2, e.g. 18 to 28 revolutions. As can be seen from FIG. 11, after the crank 6 has rotated over 30°, the kinetic energy E1 of the flywheel 2 is about 10 kJ, and the angular velocity tot of the flywheel 2 is about 110 rpm. When the crank 6 has rotated over 270°, the kinetic energy E2 of the flywheel 2 is about 115 kJ, and the angular velocity ω2 of the flywheel 2 is about 380 rpm. The exact numbers are not important, but it is clear from this example that the more time the baler 70 has before the first impact, the larger the angular velocity and thus the larger the kinetic energy at impact. In the example shown in FIG. 11 the angular velocity ratio ω2/ω1 is about 380/110=3.45, but as kinetic energy (for a pure rotational movement) is proportional to the square of angular velocity, the kinetic energy ratio E2/E1 is about 115/10=11.5. This example shows that the kinetic energy of the flywheel 2 before the first impact of the plunger 13 into the crop material 18 inside the bale chamber 80 can be increased by a factor of 11.5 (more than ten), by starting from a favorable start-position (also called "launch position") such as e.g. crank position C in FIG. 10, as compared to starting from an unfavorable position, such as e.g. crank position A in FIG. 9. It is to be noted that the kinetic energy curve shown in FIG. 11, at least for the first revolution of the crank 6, is substantially monotonically increasing with angular distance. Thus the larger the value of, the more kinetic energy the flywheel 2 will have before the "first impact", i.e. before the plunger 13 reaches its distal position 8 in the bale chamber 80.

The principle of one of the embodiments of the present invention is to provide a baler 70 wherein the flywheel 2 has gained sufficient kinetic energy before the first impact of the plunger 13 on the crop material 18 in the bale chamber 80, or, more accurately stated, since the amount of crop material 18 in the bale chamber may be a variable quantity and may even be absent, before the plunger 13 reaches its distal position 8 (see FIG. 10). This is obtained in the following way.

In a particular embodiment (not shown), the baler 70 may have a means 43b (e.g. a sensor) for determining a position of the crank 6, and the motor controller may be provided with a specially adapted algorithm for automatically rotating (e.g. reversing) the flywheel 2 to a predetermined launch position, e.g. a position from which—at the next startup—the crank 6 is situated at an angular distance of at least 90° (preferably at least 120°, more preferably at least 150°, even more preferably at least 180°, still even more preferably at least 210°, yet still even more preferably at least 240°, and most preferably at least 270°) in forward direction F from the position of the crank where the plunger 13 reaches its distal position 8. The predetermined launch position is preferably a position where the crank 6 is situated at an angular distance of at most 360°. When starting from this launch position, the risk that the baler 70 will fail to start-up is reduced, e.g. minimized, if not eliminated completely, thus the requirements for the auxiliary motor 5 can be much reduced, as it only needs to be able to slowly rotate (e.g. reverse) the flywheel 2.

A further embodiment of the present invention relates to a baler 70 comprising:
a shaft 3 for coupling with a power take-off, and a flywheel 2 connected to the shaft 3;
a plunger 13 connected to the flywheel 2 via a crank 6, the plunger 13 being adapted for performing a reciprocal movement between a near position 7 suitable for adding crop material in a bale chamber 80 and a distal position 8 suitable for compressing crop material in the bale chamber 80;
an auxiliary motor 5 connectable to the flywheel 2 and adapted for rotating said flywheel depending on a control signal s;
a disc brake system 40 comprising a brake disc 41 adapted for braking the flywheel 2 and having a toothed rim 59, the auxiliary motor 5 being engageable to the toothed rim 59 of the brake disc 41;
means 43 for determining a position of the crank 6,
a motor controller connected to the said means 43, and connected to the auxiliary motor 5 for providing the control signal s, the motor controller being provided with an algorithm for determining the control signal s for automatically rotating the flywheel 2 to a predetermined launch position.

Another aspect of the present invention relates to a method for positioning a crank 6 of an agricultural baler 70 as defined directly hereabove in a predefined launch position, the method comprising the steps of:
Determining the position of the crank 6 based on data collected by the means 43,
Determining the control signal s based on said position,
Activating said auxiliary motor 5 based on said control signal (s) so as to position said crank 6 in said predefined launch position.

Figure 12:
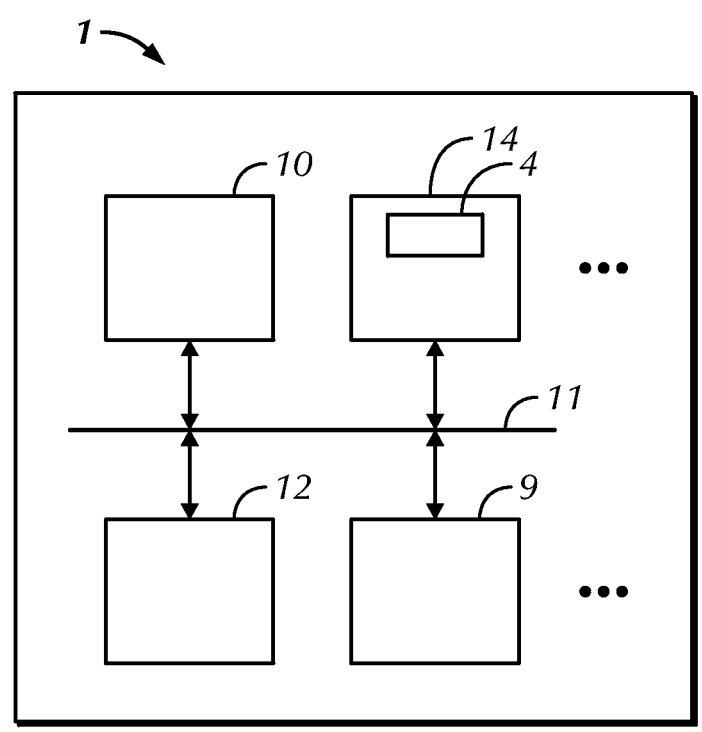
FIG. 12 shows a processing system including the instructions to implement aspects of the methods according to embodiments of the present invention.

The above-described method embodiments of the present invention may be implemented in a processing system 1 (e.g. as part of the motor controller) such as shown in FIG. 12. FIG. 12 shows one configuration of a processing system 1 that includes at least one programmable processor 10 coupled to a memory subsystem 14 that includes at least one form of memory 4, e.g., RAM, ROM, FLASH, and so forth. It is to be noted that the processor 10 or processors may be a general purpose, or a special purpose processor, and may be for inclusion in a device, e.g. a chip that has other components that perform other functions. Thus, one or more aspects of the present invention can be implemented in digital electronic circuitry, or in computer hardware, firmware, software, or in combinations of them. The processing system 1 may include a storage subsystem 12 that has at least one input port (e.g. disk drive and/or CD-ROM drive and/or DVD drive and/or USB interface, . . . ). In some implementations, a display system, a keyboard, and/or a pointing device may be included as part of a user interface subsystem 9 to provide for a user to manually input information. Ports for outputting data also may be included. More elements such as network connections, interfaces to various devices, and so forth, may be included, but are not illustrated in FIG. 12. The various elements of the processing system 1 may be coupled in various ways, including via a bus subsystem 11 shown in FIG. 12 for simplicity as a single bus, but it will be understood to those skilled in the art to include a system of at least one bus. The memory of the memory subsystem 14 may at some time hold part or all (in either case shown as 4) of a set of instructions that when executed on the processing system 1 implement the steps of the method embodiments described herein. Thus, while the hardware of a processing system 1 such as shown in FIG. 12 is prior art, a system that includes the instructions to implement aspects of the methods for positioning a crank 6 of an agricultural baler 70 in a predefined position by means of a brake disc 41 having a toothed rim 59 is not prior art, and therefore FIG. 12 is not labeled as prior art.

The present invention also includes a computer program or computer program product which provides the functionality of any of the methods according to embodiments of the present invention when executed on a computing device. Such computer program product can be tangibly embodied in a carrier medium carrying machine-readable code for execution by a programmable processor. The present invention thus also relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a memory key, a tape, a memory chip or cartridge or any other medium from which a computer can read. Various forms of computer readable media may be involved in carrying one or more sequences of one or more instructions to a processor for execution. The computer program or computer program product can be carried on an electrical carrier signal. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fiber optics, including the wires that comprise a bus within a computer.

The invention claimed is:

1. An agricultural baler comprising:
   a shaft for coupling with a power take-off;
   a flywheel connected to the shaft;
   a plunger connected to the flywheel via a crank, the plunger being adapted for performing a reciprocal movement between a near position suitable for adding crop material in a bale chamber and a distal position suitable for compressing the crop material in the bale chamber,
   an auxiliary motor connectable to the flywheel, the auxiliary motor is adapted for rotating said flywheel depending on a control signal;
   a sensor configured for determining a position of the crank; and
   a motor controller connected to said sensor and connected to the auxiliary motor for providing it with the control signal, the motor controller being provided with an algorithm for determining the control signal for automatically rotating the flywheel to a predetermined launch position.

2. The agricultural baler according to claim 1, wherein the auxiliary motor is adapted for helping to accelerate the flywheel during baler start-up.

3. The agricultural baler according to claim 1, wherein the auxiliary motor is adapted for rotating the flywheel backward.

4. The agricultural baler according to claim 1, wherein the auxiliary motor is a motor having a power of at least 1.0 kWatt.

5. The agricultural baler according to claim 1, in combination with a tractor,
   wherein the tractor comprises a PTO connectable to the shaft of the baler for accelerating the flywheel of the baler and a tractor controller circuit for sending a command to the baler controller for selectively activating the auxiliary motor.

6. A method for positioning a crank connecting a flywheel and plunger of an agricultural baler, the plunger adapted for performing a reciprocal movement between a near position suitable for adding crop material in a bale chamber and a distal position suitable for compressing the crop material in the bale chamber, in a predefined launch position, the method comprising the steps of:
   determining a position of the crank based on data collected by a sensor configured for determining the position of the crank,
   determining with a controller a control signal based on said position, activating with the controller an auxiliary motor connected to a flywheel of the baler based on the control signal and rotating said flywheel to position said crank in said predefined launch position.

* * * * *